Dec. 26, 1961 W. O. REYNAUD 3,014,491
AUTOMATIC VACUUM VALVE
Filed March 16, 1959 2 Sheets-Sheet 1

INVENTOR.
WILLIAM O. REYNAUD
BY
ATTORNEYS

Dec. 26, 1961  W. O. REYNAUD  3,014,491
AUTOMATIC VACUUM VALVE
Filed March 16, 1959  2 Sheets-Sheet 2
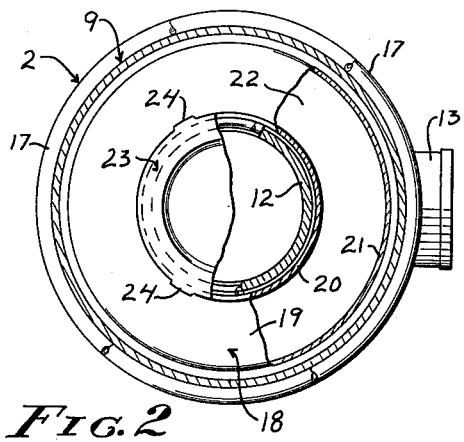
FIG. 2
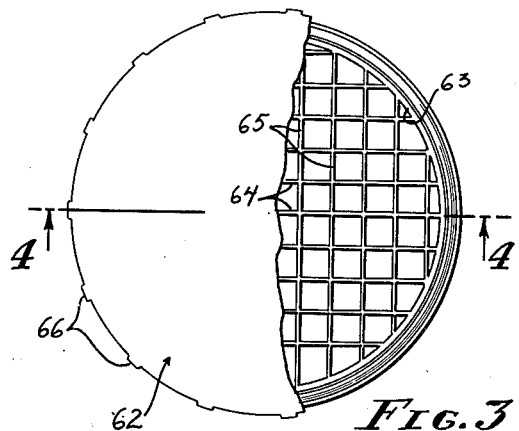
FIG. 3
FIG. 4
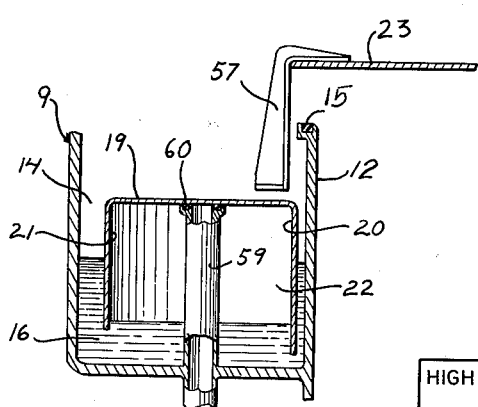
FIG. 5
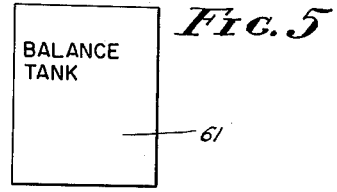
FIG. 6
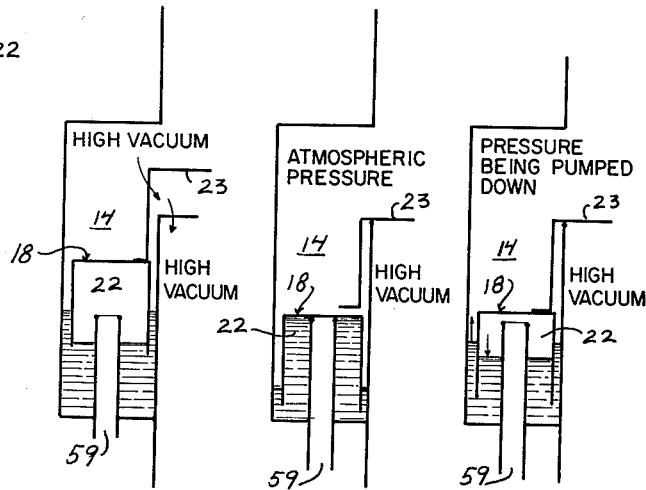
FIG. 7  FIG. 8  FIG. 9
INVENTOR.
WILLIAM O. REYNAUD
BY
ATTORNEYS United States Patent Office 3,014,491
Patented Dec. 26, 1961

3,014,491
AUTOMATIC VACUUM VALVE
William O. Reynaud, Altadena, Calif., assignor, by mesne assignments, to the United States of America as represented by the Secretary of the Army
Filed Mar. 16, 1959, Ser. No. 799,805
4 Claims. (Cl. 137—112)

This invention relates to automatic vacuum valves and included in the objects of this invention are:

First, to provide an automatic vacuum valve which normally occupies an open position within a vacuum system and which closes automatically should a predetermined but small rise in pressure occur upstream of the valve, the valve being capable of closing should a pressure rise as low as 100 microns of mercury occur, thereby providing a valve which automatically safeguards diffusion or roughing pumps or related vacuum equipment.

Second to provide an automatic vacuum valve which completely eliminates any need for openings for actuators or operating shafts, thus completely eliminating packing glands and the attendant friction or source of leakage difficulties.

Third, to provide an automatic vacuum valve which incorporates a novel float open at its underside and supported in a reservoir of mercury or low vapor pressure oil in such a manner as to respond to difference in pressures internally and externally of said float to effect opening or closing of a valve element.

Fourth, to provide an automatic device sensitive, when subjected to vacuum pressures, to a predetermined small increase in pressure thereby to operate an alarm or other electrical device.

Fifth, to provide an automatic vacuum valve, which is sufficiently responsive to slight pressure changes to effect instant closing of a valve element, that a region upstream of the valve may be deliberately open to atmosphere for access to such region without danger of a significant rise in pressure in the region downstream of the valve, thus providing an automatic vacuum valve which is particularly useful in vacuum systems in which frequent access to a region thereof is desirable, as for example in the use of electron microscopes, apparatus for producing evaporative coatings, and other related apparatus.

Sixth, to provide an automatic vacuum valve in which although the moving parts are extremely light weight for sensitive operation is capable of construction in large sizes such as required in vacuum systems having conduits several feet in diameter.

With the above and other objects in view as may appear hereinafter, reference is directed to the accompanying drawings in which:

FIGURE 2 is a transverse, sectional view through line 2—2 of FIGURE 1;

FIGURE 3 is a fragmentary view showing a vacuum valve seat and valve disk as may be employed in the control of large diameter vacuum valves;

FIGURE 4 is a fragmentary, transverse sectional view through line 4—4 of FIGURE 3;

FIGURE 5 is a fragmentary, sectional view showing a modified form of the invention employed as a vacuum pressure change sensing valve;

FIGURE 6 is a reduced fragmentary, substantially diagrammatical side view thereof with portions broken away and in section; and FIGURES 7, 8 and 9 are fragmentary, substantially diagrammatical views showing the position of the moving parts of the valve under various conditions.

Figure 1:
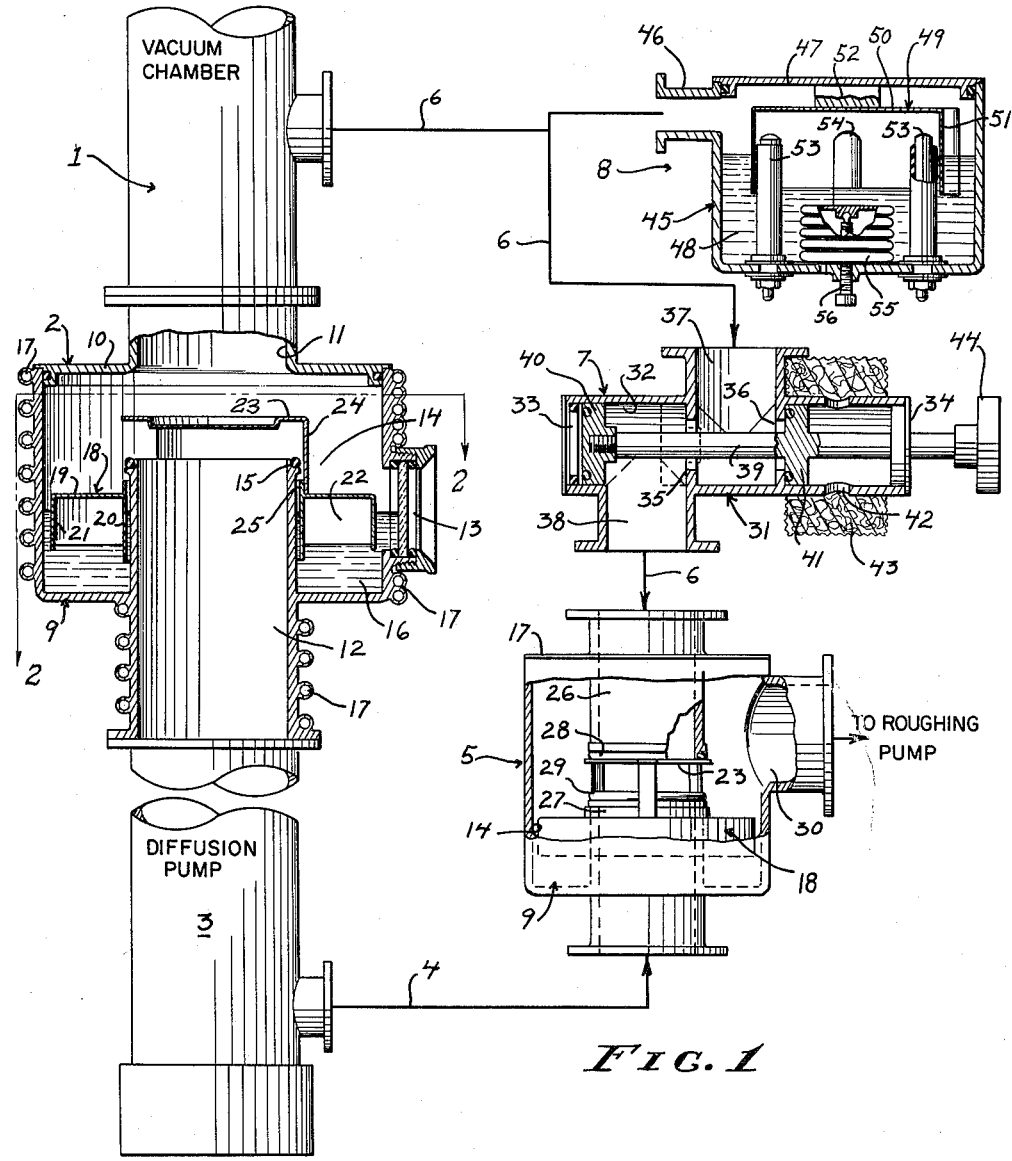
FIGURE 1 is a diagrammatical view showing a vacuum system and showing several embodiments of the invention adapted to various parts of the vacuum system, the several embodiments and essentially related elements being shown in cross section.

Reference is first directed to FIGURE 1. Illustrated fragmentarily is a vacuum chamber 1 which may be the vacuum chamber associated with an electron microscope or other vacuum apparatus. One end of the vacuum chamber is connected to a single acting automatic vacuum pressure change sensing valve 2 constituting one form of the invention. The valve in turn is connected to a diffusion pump 3. A vacuum line 4 extends from the diffusion pump to a roughing pump, not shown.

Interposed in the vacuum line 4 is a double acting automatic vacuum pressure change sensing valve 5 constituting another embodiment of the invention. A vacuum line 6 extends from the vacuum chamber 1 to the double acting automatic valve 5. Interposed in the line 6 is a switching valve 7 arranged to connect the vacuum chamber 1 to the valve 5 or to atmosphere. In a line branching from the line 6 is an automatic vacuum pressure change sensing indicator 8 which constitutes another embodiment of the invention.

The single acting automatic vacuum pressure change sensing valve 2 includes a cylindrical housing 9 having a cover 10 suitably secured thereto. The cover is provided with a large inlet port 11 connected with the vacuum chamber 1. The valve housing 9 is provided with an outlet conduit 12 which projects upwardly into the valve housing in spaced coaxial relation with the inlet port 11. A side of the valve housing 9 may be provided with a window 13.

The outlet conduit 12 forms with the housing 9 an annular chamber 14. The upper extremity of the conduit 12 is provided with a valve seat 15 which may be formed by an O-ring. The annular chamber 14 is partially filled with a buoying liquid 16. If the nature of the vacuum system permits, the buoying liquid may be mercury, but if the vacuum system is intended for producing high vacuum, any of the specially designed low vapor pressure oils used in such high vacuum systems may be employed. In some cases it is desirable to surround the housing 9 and external portion of the conduit 12 with a heat exchange coil 17.

Mounted within the annular chamber 14 is a float 18 in the form of an inverted cup. The float is thus provided with a top wall 19, a radial inner wall 20 and a radial outer wall 21. The inner and outer walls extend into the buoying liquid 16 so that the annular float forms with the buoying liquid an annular gas compartment 22.

Disposed over the conduit 12 so as to engage the valve seat 15 is a valve plate 23. The central portion may be recessed slightly for stiffening purposes. Extending downwardly from the periphery of the plate 23 are legs 24 which clear the outside of the conduit 12 and are attached to the float 18. For this purpose the float may be provided with an upstanding rim 25.

Reference is now directed to the double acting valve 5 shown in FIGURE 1 which is essentially the same as the first described valve except that in place of the inlet port 11 and outlet conduit 12 an upper inlet tube 26 and lower inlet tube 27 are provided. These tubes are disposed coaxially with their adjacent end spaced from each other and provided with valve seats 28 and 29. The lower inlet tube 27 corresponds structurally to the outlet conduit 12 of the first described structure; that is, it forms with the valve housing an annular chamber 14 which is partially filled with buoyant liquid. The annular chamber receives a float 18 which supports a valve plate 23 as in the first described structure. This valve plate moves between sealing engagement with either the valve seat 28 or the valve seat 29. The housing in this case is provided with a side outlet 30 which communicates with a roughing pump, not shown.

Reference is now directed to the switching valve 7.

This valve includes a valve body 31. The valve body is provided with a longitudinal bore 32 provided with end closures 33 and 34. Intermediate its ends the bore is provided with spaced annular valve seats 35 and 36. Between the valve seats the bore 32 is provided with a lateral port 37 communicating through the vacuum line 6 with the vacuum chamber 1. Between the valve seat 35 and end closure 33 the bore 32 is provided with a side port 38 communicating through the continuation of the line 6 to the upper inlet tube 26 of the valve 5. Slidably mounted within the bore 32 is a valve rod 39 having valve disks 40 and 41 which engage the remote sides of the valve seats 35 and 36 respectively. Between the valve disk 41 and valve seat 36 the bore 32 is provided with air inlet ports 42 which may be covered by a suitable filter 43. The valve rod protrudes from the end closure 34 and may be manually operated by a handle 44 or controlled by a solenoid or other suitable device.

Reference is now directed to the vacuum indicator 8. This device includes a cylindrical housing 45 having a side port 46 and a cover 47 so that except for the side port the housing 45 is completely closed. The housing contains a buoying liquid 48 on which is disposed a float 49. The float 49 is in the form of an inverted cup and includes a top wall 50 and side walls 51. Upward movement of the float is limited by a stop 52. Downward movement is limited by a pair of contact posts 53 and a third equalizing post 54. The contact posts are insulated so that an electric circuit may be completed when the float occupies its lower position. In order to adjust the position of the float a bellows 55 is submerged in the buoying liquid and is capable of a vertical movement by a screw 56 accessible externally of the housing.

Reference is now directed to FIGURE 5. This construction is essentially the same as the single acting valve 2 or the double acting valve 5. It differs in two respects. First, the valve plate 23 is provided with legs 57 which do not connect to the float 18 but merely extend thereover so that the float engages the lower extremities of the legs to lift the valve plate when the float tends to raise.

Second, the float when in its lower position rests on a pair of posts 58 and on the upper end of a tube 59. The posts 58 and tube 59 define a triangle. The upper end of the tube is provided with a seal ring 60 so as to be closed by the upper or top wall 19 of the float. The tube 59 extends downwardly through the bottom of the valve housing and communicates with a closed balance tank or auxiliary compartment 61 located outside the housing 9.

Reference is now directed to FIGURES 3 and 4. It is desirable in vacuum systems to make the passages as large as possible. In some instances they may be several feet in diameter. In order to accommodate a valve disk 62 of large dimension, the confronting end of the conduit such as the conduit 12 or the tube 26 or 27 receives a ring 63 in which is disposed a load distributing grid comprising cross beams 64 and cross wires 65. As the diameter of the valve disk increases, the number of legs 66 needed for engagement with the float is increased.

The automatic vacuum pressure change sensing means, whether in the form of the single acting valve 2 or the double acting valve 5 or as an indicator 8, have the same mode of operation which is best illustrated in FIGURES 7, 8 and 9. Assuming first that the device is being used as a valve and has been installed in a vacuum system, part of which is maintained under vacuum and part of which may be opened periodically to atmosphere, a condition will exist as shown in FIGURE 7 in which the valve plate 23 is opened and vacuum pressure exists both upstream and downstream thereof; that is, a vacuum pressure exists in the annular chamber 14. A slightly higher pressure exists in the gas compartment 22 under the float 18. This pressure will be determined by the weight of the float and its area; that is, the amount of liquid which must be displaced in order to support the float.

If the pressure in the gas chamber 22 has been in excess of that necessary to support float 18, it will have previously escaped from the under side of the float through the pipe 59 shown in FIGURE 5.

Should the pressure upstream of the valve increase a predetermined amount, the air pressure inside the float will no longer exert a force sufficient to support the float in its upper position and it will move toward its lower position. In practice the float walls are made as thin and light as possible and the area is as large as possible so that the amount of liquid to be displaced and consequently the pressure within the float has a minimum value above that of the vacuum pressure in the system. As a consequence only a slight increase in upstream pressure is required to effect closing of the valve. After the valve closes, the upstream pressure may increase to atmospheric pressure in which case the gas entrapped in the float will compress so that the buoying liquid will almost entirely fill the float as shown in FIGURE 8.

If the pressure upstream of the valve plate is reduced to a vacuum pressure close to that under the valve plate, the gas compressed within the float will expand as indicated in FIGURE 9. When sufficient liquid is displaced to restore buoyance, the float will move upward and the valve will move to its open position shown in FIGURE 7. There is a tendency for the float to snap to its open position.

In the above description of the operation of the valve the function of the tube 59 and balance tank 61 has been ignored. In the construction of small valves, for example, those controlling conduits under two inches in diameter, the area of the float may be large enough and the axial length of travel is small enough that the float may move from its open to its closed position without significant increase in the air pressures in the compartment 22. However, even in this case the closing pressure increases as the valve moves toward its closed position unit it gets close enough to its completely closed position that the pressure differential across the valve plate is sufficient to force the plate to its sealed position.

It is desirable, however, to minimize as much as possible the increase in required pressure between that which initiates closing of the valve and that which effects completion of its closing movement. This is accomplished by use of the tube 59 and the balance tank 61. If the tank is quite large as compared to the gas volume under the float when the float is in its open position shown in FIGURE 7, then there will be a correspondingly small change in pressure when the valve moves to its closed position. This pressure change may be so small as to be negligible. While it is not essential to the operation of the balance tank 61 that the tube 59 be sealed when the float moves to its lower position, it is desirable to seal the tube to prevent any loss of buoying liquid into the tube 59 and balance tank 61 for, as noted in FIGURE 8, if the pressure differential across the closed valve plate 23 is substantial and the previous pressures in the float were low as, for example, a few mm. Hg, the float becomes almost completely filled with liquid. The seal also minimizes the need of repumping the balance tank.

The operation of the valve so far described has been directed primarily to the single acting valve 2. However, the double acting valve 5 functions in substantially the same manner, except that when the float is in its upper position the conduit 26 is closed.

With reference to FIGURE 1 the system as a whole is operated as follows: It is desirable to maintain a vacuum at the diffusion pump 3. It is also desirable in most vacuum systems to open a region to atmospheric pressures such as the region associated with the vacuum chamber 1. To accomplish this, the plunger of the valve 7 is moved to the right opening the vacuum chamber 1 to atmosphere. The instant that a rise in pressure develops in the chamber 14 of the housing 9 the valve 2 closes. Also the instant that the pressure rises and before closure of the valve disk 40 against valve seat 35 sufficient pressure is exerted on the disk of the double acting valve 23 to force the float downward to seat against the lower inlet tube 27 and thus isolate the diffusion pump. When the plunger has moved completely to the right, the valve disk 40 seals against the valve seat 35 so that the region downstream of the valve disk may be restored by the roughing pump to the normal fore vacuum pressure within the capabilities of the roughing pump. When the fore vacuum pressure is thus established the valve disk 23 of the valve 5 tends to occupy a neutral position so that both conduits 26 and 27 are open to the roughing pump.

When it is again desired to establish a vacuum in the chamber 1, the plunger is moved back to the position shown in FIGURE 1. This occurs while the valve 2 remains closed. The valve disk 23 of valve 5 immediately moves to its lower position isolating the diffusion pump. The roughing pump then reduces the pressure in the vacuum chamber to the fore vacuum pressure. This may be in the range of $10^{-2}$ mm. Hg; whereas, for comparison, the vacuum pressures in the diffusion pump are in the range of $10^{-5}$ to $10^{-8}$ mm. Hg and better. As the pressure in the annular chambers 14 surrounding the valve floats in the valves 2 and 5 approaches the fore pressure, the pressure of the entrapped gas in the compartments 22 of these valves displaces the liquid so that the floats move upward raising their respective valve plates. The valves are preferably so arranged that the valve 5 tends to open before valve 2.

With reference to the vacuum indicator 8, the float 49 functions much in the manner of the float 18. That is, assuming a vacuum pressure in the housing surrounding the float, there will exist a slightly higher pressure under the float sufficient to displace a volume of liquid corresponding to the weight of the float. In the event of increase in pressure in the housing, the pressure within the float is no longer sufficient to displace liquid to hold the float in its upper position whereupon the float descends and engages the contacts 53. These contacts may be connected in a circuit to operate a warning light or any other electrical means such as a solenoid valve for control of other parts of the vacuum system or to start an auxiliary pumping system. If desired, the tube 59 and balance tank 61 may be employed in conjunction with the float 49.

Having thus described certain embodiments and applications of my invention, I do not desire to be limited thereto, but intend to claim all novelty inherent in the appended claims.

I claim:

1. An automatic vacuum pressure change sensing means, comprising: a housing structure having a chamber; a buoying liquid partially filling said chamber; a float closed at one end and open at the other end and having side walls contacting said liquid to form therewith a gas compartment normally isolated from said chamber; said float tending to occupy a raised position when the pressure of gas in said compartment exceeds the pressure in said chamber in an amount to exert a lifting force exceeding the weight of said float; said float tending to occupy a lowered position when the gas pressure in said compartment exerts a force less than the weight of said float, whereby on establishing a selected vacuum pressure in said chamber, and a correspondingly higher pressure in said compartment to elevate said float, a subsequent predetermined rise in pressure in said chamber causes said float to move from a raised position to a lowered position; and means defining a sealed auxiliary compartment disposed externally of said chamber and communicating with the float defined compartment.

2. An automatic vacuum pressure change sensing means, comprising: a housing structure having a chamber; a buoying liquid partially filling said chamber; a float closed at one end and open at the other end and having side walls contacting said liquid to form therewith a gas compartment normally isolated from said chamber; said float tending to occupy a raised position when the pressure of gas in said compartment exceeds the pressure in said chamber in an amount to exert a lifting force exceeding the weight of said float; said float tending to occupy a lowered position when the gas pressure in said compartment exerts a force less than the weight of said float, whereby on establishing a selected vacuum pressure in said chamber and a correspondingly higher pressure in said compartment to elevate said float, a subsequent predetermined rise in pressure in said chamber causes said float to move from a raised position to a lowered position; a fixed tube extending upwardly from the underside of said housing into said gas compartment and having an open end above the liquid level therein, said end being engageable and sealed by the closed end of said float when said float is in its lowered position; and means defining an auxiliary compartment communicating with said float defined compartment through said tube, the volume of said auxiliary compartment being sufficient, in comparison to the volume of said float defined compartment to permit displacement between the extreme positions of said float without substantial change in pressure within said float defined compartment and auxiliary compartment.

3. An automatic vacuum pressure change sensing means as set forth in claim 2 wherein: valve means is operatively connected to said float to move out of engagement with a first valve seat means when said float is in a raised position, and into engagement with a first valve seat means when said float is in its lowered position.

4. An automatic vacuum pressure change sensing means as set forth in claim 2 wherein: a valve disk is operatively connected with said float in concentric relation therewith; a vacuum conduit extends upwardly through said float for engagement by said valve disk; and said housing is provided with a port cooperating with said conduit.

References Cited in the file of this patent

UNITED STATES PATENTS

| | | |
|---|---|---|
| 2,436,350 | Bader | Feb. 17, 1948 |
| 2,482,167 | Gilmont | Sept. 20, 1949 |
| 2,702,047 | Gilmont | Feb. 15, 1955 |